United States Patent
Nakajima (10) Patent No.: US 11,768,922 B2
(45) Date of Patent: Sep. 26, 2023

(54) LICENSE MANAGEMENT DEVICE, PROGRAM EXECUTION DEVICE AND METHOD

(71) Applicant: NEC Solution Innovators, Ltd., Tokyo (JP)

(72) Inventor: Noboru Nakajima, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 11 days.

(21) Appl. No.: 17/262,942

(22) PCT Filed: Aug. 2, 2019

(86) PCT No.: PCT/JP2019/030472
§ 371 (c)(1),
(2) Date: Jan. 25, 2021

(87) PCT Pub. No.: WO2020/027320
PCT Pub. Date: Feb. 6, 2020

(65) Prior Publication Data
US 2021/0312015 A1    Oct. 7, 2021

(30) Foreign Application Priority Data
Aug. 2, 2018    (JP) .................................. 2018-146307

(51) Int. Cl.
*G06F 21/10* (2013.01)
*G06F 21/62* (2013.01)

(52) U.S. Cl.
CPC .......... *G06F 21/105* (2013.01); *G06F 21/629* (2013.01); *G06F 2221/0766* (2013.01)

(58) Field of Classification Search
CPC ................. G06F 21/105; G06F 21/629; G06F 2221/0766
(Continued)

(56) References Cited

U.S. PATENT DOCUMENTS

2004/0117784 A1*  6/2004  Endoh ..................... G06F 21/10
                                                                    717/169
2004/0139341 A1    7/2004  Yamaguchi et al.
(Continued)

FOREIGN PATENT DOCUMENTS

CN          101365098 B  *  11/2010
CN          102117388 A  *  7/2011    ........... G06F 21/121
(Continued)

OTHER PUBLICATIONS

Kiyomoto et al., "LMM: A common component for software license management on cloud," 2013 International Conference on Security and Cryptography (SECRYPT), 2013, pp. 1-12. (Year: 2013).*
(Continued)

*Primary Examiner* — Peter C Shaw (57) ABSTRACT

A license issuing means issues a license file to an application program using a library containing a plurality of functions. The license file contains licensed function information for specifying a function allowed to be used among the plurality of functions contained in the library. An authentication means performs license authentication based on the license file. A function activation means activates a function specified by the licensed function information among the plurality of functions in the library based on a result of the license authentication. A program execution means executes the application program by using the activated function.

10 Claims, 6 Drawing Sheets

(58) Field of Classification Search
USPC .......................................................... 726/29
See application file for complete search history.

(56) References Cited

U.S. PATENT DOCUMENTS

| | | | |
|---|---|---|---|
| 2006/0106729 A1 | 5/2006 | Roberts, Jr. | |
| 2009/0274304 A1* | 11/2009 | Kobayashi | G06F 21/10 |
| | | | 726/26 |
| 2010/0229231 A1* | 9/2010 | Iwai | G06F 21/10 |
| | | | 726/28 |
| 2011/0276808 A1 | 11/2011 | Yuki | |
| 2014/0115672 A1 | 4/2014 | Wood et al. | |
| 2014/0173718 A1 | 6/2014 | Kodama | |
| 2014/0245456 A1 | 8/2014 | Kaneko | |
| 2016/0112210 A1* | 4/2016 | Hayes | G06F 21/105 |
| | | | 713/176 |
| 2017/0140131 A1 | 5/2017 | Greenberg et al. | |
| 2019/0147145 A1 | 5/2019 | Matsudaira | |

FOREIGN PATENT DOCUMENTS

| | | | | |
|---|---|---|---|---|
| JP | H05-313905 A | | 11/1993 | |
| JP | 2002-041170 A | | 2/2002 | |
| JP | 2003271462 A | * | 9/2003 | |
| JP | 2004-038394 A | | 2/2004 | |
| JP | 2004139149 A | * | 5/2004 | ............. G06F 13/10 |
| JP | 2006073002 A | * | 3/2006 | ......... G06F 9/44573 |
| JP | 3982857 B2 | * | 9/2007 | ........... G06F 21/125 |
| JP | 4319804 B2 | * | 8/2009 | |
| JP | 2009-271680 A | | 11/2009 | |
| JP | 2011-237869 A | | 11/2011 | |
| JP | 2013191082 A | * | 9/2013 | |
| JP | 2014-120118 A | | 6/2014 | |
| JP | 2014-167718 A | | 9/2014 | |
| JP | 2015-631950 A | | 11/2015 | |
| JP | 6108455 B2 | | 4/2017 | |
| JP | 6260239 B2 | | 1/2018 | |
| WO | WO-0223368 A1 | * | 3/2002 | ....... G06F 17/30873 |
| WO | WO-2006031127 A2 | * | 3/2006 | ............. G06F 21/10 |
| WO | WO-2010133264 A1 | * | 11/2010 | ............. B60T 8/885 |
| WO | 2017/216900 A1 | | 12/2017 | |

OTHER PUBLICATIONS

Zhao et al., "Policy-driven licensing model for component software," Proceedings POLICY 2003. IEEE 4th International Workshop on Policies for Distributed Systems and Networks, 2003, pp. 219-228, doi: 10.1109/POLICY.2003.1206976. (Year: 2003).*
Costea et al., "Secure Software Licensing: Models, Constructions, and Proofs," 2016 IEEE 29th Computer Security Foundations Symposium (CSF), 2016, pp. 31-44, doi: 10.1109/CSF.2016.10. (Year: 2016).*
Kraus et al., "Solution for Licensing of Software Modules in Automotive Industry," 2018 Zooming Innovation in Consumer Technologies Conference (ZINC), 2018, pp. 166-170, doi: 10.1109/ZINC.2018.8448697. (Year: 2018).*
Kim et al., "Base line performance measurements of access controls for libraries and modules," Proceedings 20th IEEE International Parallel & Distributed Processing Symposium, Rhodes, Greece, 2006, pp. 8 pp.-, doi: 10.1109/IPDPS.2006.1639685. (Year: 2006).*
Hongchang et al., "The Security Design of Digital Library," 2012 International Conference on Computer Science and Service System, Nanjing, China, 2012, pp. 339-342, doi: 10.1109/CSSS.2012.92. (Year: 2012).*
Tsantekidis et al., "Efficient Monitoring of Library Call Invocation," 2019 Sixth International Conference on Internet of Things: Systems, Management and Security (IOTSMS), Granada, Spain, 2019, pp. 387-392, doi: 10.1109/IOTSMS48152.2019.8939203. (Year: 2019).*
Chee et al., "Software reusability with SML," Proceedings of 6th International Workshop on Computer-Aided Software Engineering, Singapore, 1993, pp. 254-262, doi: 10.1109/CASE.1993.634826. (Year: 1993).*
International Search Report for PCT Application No. PCT/JP2019/030472, dated Nov. 5, 2019.
Japanese Office Communication for JP Application No. 2020-534771 dated Jul. 26, 2022 with English Translation.
Extended European Search Report for EP Application No. EP19844988.6 dated Mar. 28, 2022.

* cited by examiner

LICENSE MANAGEMENT DEVICE, PROGRAM EXECUTION DEVICE AND METHOD

This application is a National Stage Entry of PCT/JP2019/030472 filed on Aug. 2, 2019, which claims priority from Japanese Patent Application 2018-146307 filed on Aug. 2, 2018, the contents of all of which are incorporated herein by reference, in their entirety.

TECHNICAL FIELD

The present disclosure relates to a license management device, license issuing device and method, program execution device and method, and a computer-readable medium.

TECHNICAL FIELD

In order to prevent unauthorized use of software, license-based control of execution of an application program is known as related art. For example, Patent Literature 1 discloses a software usage control system that manages the license usage for application software in a client PC (Personal Computer). In Patent Literature 1, a license management means controls licensing or the like by using a contract information table in which the content of license agreements for each user is registered and a license management table in which the license usage status for each user is registered.

Further, Patent Literature 2 discloses license authentication using a proxy terminal. In Patent Literature 2, a business application is installed to an offline terminal that cannot communicate with a license management server. When there is no license file, the offline terminal writes a license authentication program to a USB (Universal Serial Bus) memory. The USB memory is connected to an online terminal, which is a proxy terminal, and the online terminal reads the authentication program from the USB memory. The online terminal executes the authentication program and accesses the license management server, and thereby acquires a license file. The online terminal writes the acquired license file to the USB memory. The USB memory is connected to the online terminal, and the online terminal acquires the license file from the USB memory and activates the business application.

Patent Literature 3 discloses a software license management system. Patent Literature 3 describes that an electronic license authentication method that associates a license with a specific device and limits the use of software to this specific device has become mainstream instead of a license authentication method based on hardware such as a USB dongle.

CITATION LIST

Patent Literature

PTL1: Japanese Patent No. 6108455
PTL2: Japanese Patent No. 6260239
PTL3: International Patent Publication No. WO2017/216900

SUMMARY OF INVENTION

Technical Problem

In a business application, there is a case where desired processing is implemented by registering a plurality of functions into a library and using the functions registered in the library. The library contains a program for implementing a function of detecting an object from an image and a program for implementing a function of recognizing characters contained in the image, for example. In such a case, only the object detecting function is needed in a certain business application, and only the character recognition function is needed in another business application in some cases.

In the license authentication according to related art including Patent Literatures 1 to 3, a license is granted for the entire application. In this case, when the use of an application containing a library is permitted, a user who uses the licensed application can access the entire library contained in this application. Thus, in the case of allowing a user to use a certain function in the library having a plurality of functions, it has been necessary to extract this function and put it into the application. In this case, it is necessary to deploy a different version of library for each business application, which increases the number of man-hours. Further, this raises the need to verify whether a different version of deployed library works correctly.

In view of the foregoing, an object of the present disclosure is to provide a license management device, license issuing device and method, program execution device and method, and a computer-readable medium that allow a user to use only a certain function while using a single version of library containing a plurality of functions.

Solution to Problem

To achieve the above object, the present disclosure provides a license management device including a license issuing means for issuing, to an application program using a library containing a plurality of functions, a license file containing licensed function information for specifying a function allowed to be used among the plurality of functions contained in the library, an authentication means for performing license authentication based on the license file, a function activation means for activating a function specified by the licensed function information among the plurality of functions based on a result of the license authentication, and a program execution means for executing the application program by using the activated function.

The present disclosure further provides a license issuing device including a license issuing means for issuing, to an application program using a library containing a plurality of functions, a license file containing licensed function information for specifying a function allowed to be used among the plurality of functions contained in the library.

The present disclosure provides a program execution device including a function activation means for, based on a result of license authentication performed based on a license file issued to an application program using a library containing a plurality of functions, the license file containing licensed function information for specifying a function allowed to be used among the plurality of functions contained in the library, activating a function specified by the licensed function information among the plurality of functions, and a program execution means for executing the application program by using the activated function.

The present disclosure provides a license issuing method including issuing, to an application program using a library containing a plurality of functions, a license file containing licensed function information for specifying a function allowed to be used among the plurality of functions contained in the library.

The present disclosure provides a program execution method including, based on a result of license authentication performed based on a license file issued to an application program using a library containing a plurality of functions, the license file containing licensed function information for specifying a function allowed to be used among the plurality of functions contained in the library, activating a function specified by the licensed function information among the plurality of functions, and executing the application program by using the activated function.

The present disclosure provides a computer-readable medium storing a license issuing program causing a computer to perform processing of issuing, to an application program using a library containing a plurality of functions, a license file containing licensed function information for specifying a function allowed to be used among the plurality of functions contained in the library.

The present disclosure provides a computer-readable medium storing an application program causing a computer to perform processing of based on a result of license authentication performed based on a license file containing licensed function information for specifying a function allowed to be used among a plurality of functions contained in a library containing the plurality of functions, activating a function specified by the licensed function information among the plurality of functions, and executing specified processing by using the activated function.

Advantageous Effects of Invention

The license management device, the license issuing device and method, the program execution device and method, and the computer-readable medium according to the present disclosure allow a user to use only a certain function while using a single version of library containing a plurality of functions.

DESCRIPTION OF EMBODIMENTS

Figure 1:
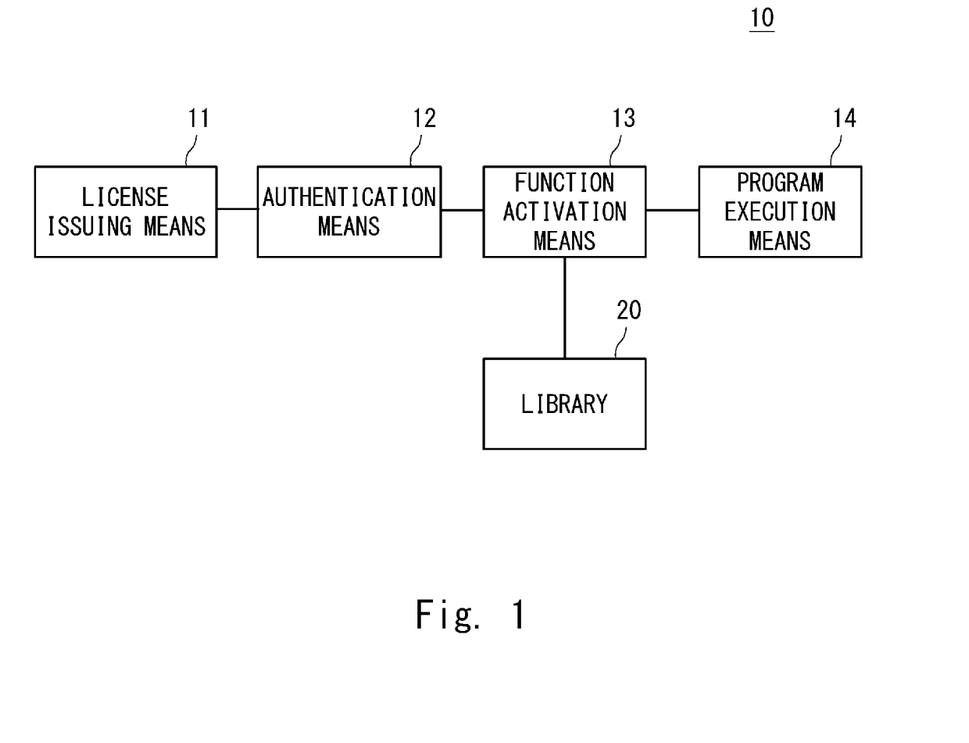
FIG. 1 is a block diagram showing a schematic license management device according to the present disclosure.

Prior to describing an example embodiment of the present disclosure, the overview of the present disclosure will be described. FIG. 1 shows a schematic license management device according to the present disclosure. A license management device 10 includes a license issuing means 11, an authentication means 12, a function activation means 13, and a program execution means 14. The license issuing means 11 issues a license file to an application program that uses a library 20. The library 20 contains a plurality of functions. The license file contains licensed function information for specifying a function that is allowed to be used among a plurality of functions contained in the library 20.

The authentication means 12 performs license authentication based on the license file. The function activation means 13 activates the function specified by the licensed function information contained in the license file among the plurality of functions contained in the library 20 based on a result of the license authentication. The program execution means 14 executes the application program by using the activated function.

In the present disclosure, the license file contains the licensed function information, and the function specified by the licensed function information is activated among the plurality of functions contained in the library 20. The program execution means 14 performs processing by using the activated function among the functions contained in the library 20. Note that the program execution means 14 cannot use the function that is not activated among the functions contained in the library 20. This allows a user to use only a certain function while using the library 20 containing a plurality of functions.

Figure 2:
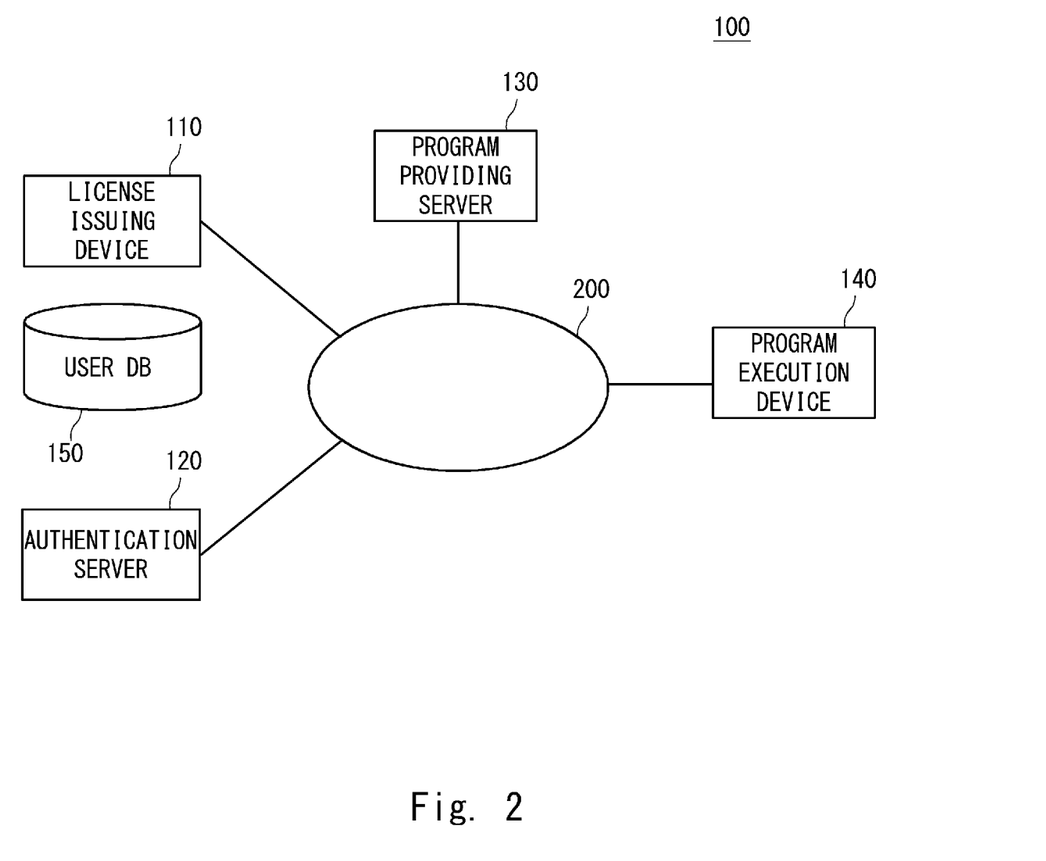
FIG. 2 is a block diagram showing a license management device according to an example embodiment of the present disclosure.

An example embodiment of the present disclosure will be described hereinafter with reference to the drawings. FIG. 2 shows a license management system according to an example embodiment of the present disclosure. A license management system 100 includes a license issuing device 110, an authentication server 120, a program providing server 130, a program execution device 140, and a user DB (Database) 150. In the license management system 100, the license issuing device 110, the authentication server 120, the program providing server 130, and the program execution device 140 are connected with one another through a network 200. The network 200 is configured as a communication network such as the Internet, a public network, a private line or a mobile communication network, for example. The license management system 100 corresponds to the license management device 10 shown in FIG. 1.

The program execution device 140 executes an application program (business application) that uses a library containing a plurality of functions. The program execution device 140 is a personal computer that is used by a user, for example, and it includes a CPU (Central Processing Unit), a ROM (Read Only Memory), a RAM (Random Access Memory), a hard disk device, a display, a keyboard, a mouse and the like. The program execution device 140 is configured to include the function activation means 13 and the program execution means 14 in FIG. 1.

The license issuing device 110 issues a license file to an application program that uses a library. The license file contains licensed function information for specifying a function that is allowed to be used when executing the application program among a plurality of functions contained in the library. The license file may further contain hardware information of the program execution device 140. The hardware information contains identification information of a processor, a network card and the like included in the program execution device 140, for example. The license issuing device 110 registers information of the issued license file in a user DB. The license issuing device 110 is configured to include the license issuing means 11 in FIG. 1.

The program providing server 130 provides an application program to the program execution device 140 through the network 200. The application program may be provided in any way. The application program may be purchased at a store (including a market place on the Internet) or the like, or may be sent by mail. The application program is provided to a user together with the license file issued by the license issuing device 110. For example, the program providing server 130 requests the license issuing device 110 to issue a license file and acquires the license file from the license issuing device 110. The program providing server 130 may provide the acquired license file and the application program to a user through the network 200. Alternatively, the license file and the application may be provided to a user separately.

The authentication server 120 authenticates the execution of the application program in the program execution device 140. The authentication server 120 receives a request for license authentication from the program execution device 140 at given timing, for example. The authentication server 120 then performs license authentication based on the license file. At this time, the authentication server 120 may verify that the license file is not tampered.

In the license authentication, the authentication server 120 refers to the user DB 150 and determines whether the hardware information of the program execution device 140 that has requested license authentication matches the hardware information of the program execution device 140 to which the license file has been issued. When the authentication server 120 determines that they match, it returns a license authentication result indicating authentication success to the program execution device 140. The authentication server 120 is configured to include the authentication means 12 in FIG. 1.

Note that, instead of performing the license authentication with use of the authentication server 120, the license authentication may be performed in the program execution device 140. Stated differently, the program execution device 140 may be configured to include the authentication means 12 in FIG. 1. In the case of performing the license authentication offline, the program execution device 140, for example, may compare the hardware information contained in the license file with the hardware information of the program execution device 140 and determine whether they match. The program execution device 140 determines that authentication is successful when they match, and determines that authentication is failed when they do not match.

Based on the result of the license authentication, the program execution device 140 activates the function specified by the licensed function information among the plurality of functions contained in the library. The program execution device 140 executes the application program by using the activated function among the plurality of functions contained in the library.

Figure 3:
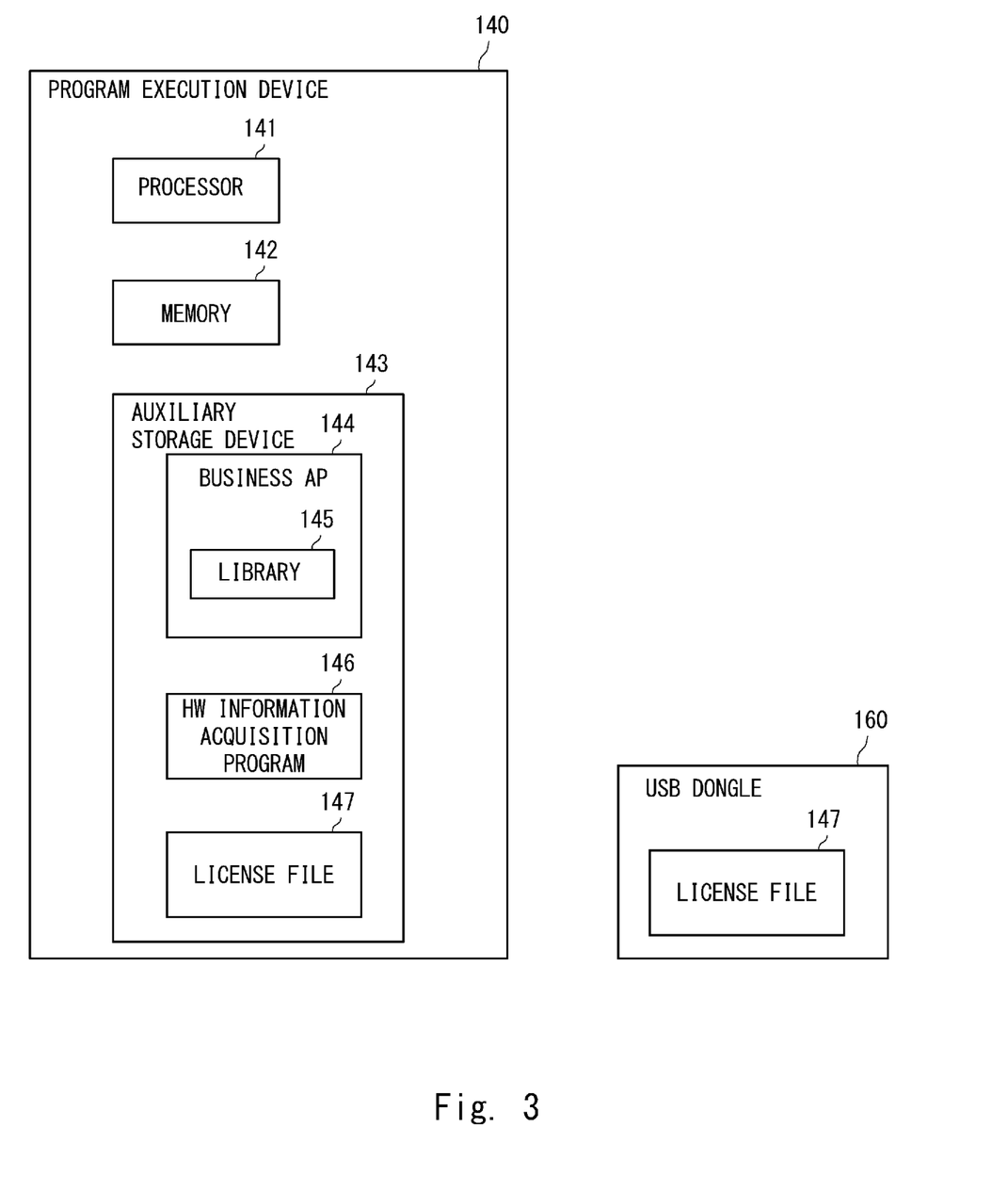
FIG. 3 is a block diagram showing a configuration example of a program execution device.

FIG. 3 shows a configuration example of the program execution device 140. The program execution device 140 includes a processor 141, a memory 142, and an auxiliary storage device 143. The auxiliary storage device 143 is configured as a hard disk device or the like, for example. The auxiliary storage device 143 stores a business AP (Application) 144, a HW (Hardware) information acquisition program 146, and a license file 147. The processor 141 executes various programs including the business AP 144 and the HW information acquisition program 146.

The business AP 144 contains a library 145. The library 145 corresponds to the library 20 in FIG. 1. In the auxiliary storage device 143, the library 145 is encrypted and stored. The license file 147 is issued to the business AP 144. The program execution device 140 stores the license file issued by the license issuing device 110 into the auxiliary storage device 143. Note that the license file 147 may be placed in a specified electronic device such as a USB dongle 160. In this case, the program execution device 140 may read the license file 147 from the USB dongle 160.

The HW information acquisition program 146 collects the hardware information of the program execution device 140. The HW information acquisition program 146 is provided from the license issuing device 110 and installed to the program execution device 140, for example. The HW information acquisition program 146 transmits the acquired hardware information to the license issuing device 110. The license issuing device 110 issues a license file containing the licensed function information and the hardware information. Alternatively, the license issuing device 110 registers the acquired hardware information in association with the issued license file into the user DB 150.

Figure 4:
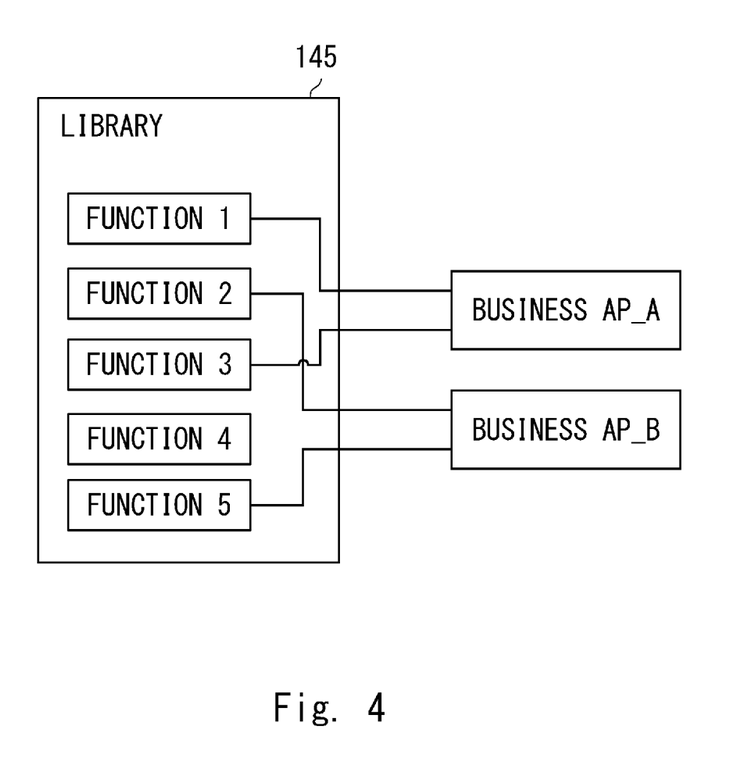
FIG. 4 is a view showing the relationship between functions contained in a library and business APs.

FIG. 4 shows the relationship between the functions contained in the library 145 and the business AP 144. In this example, two business APs 144, i.e., a business AP_A and a business APB are considered. It is assumed that the library 145 has five functions, i.e., functions 1 to 5. The business AP_A performs processing by using the functions 1 and 3 among the five functions. On the other hand, the business AP_B performs processing by using the functions 2 and 5. In this case, the license file that contains the functions 1 and 3 as the licensed function information is issued for the business AP_A. Further, the license file that contains the functions 2 and 5 as the licensed function information is issued for the business AP_B.

Figure 5:
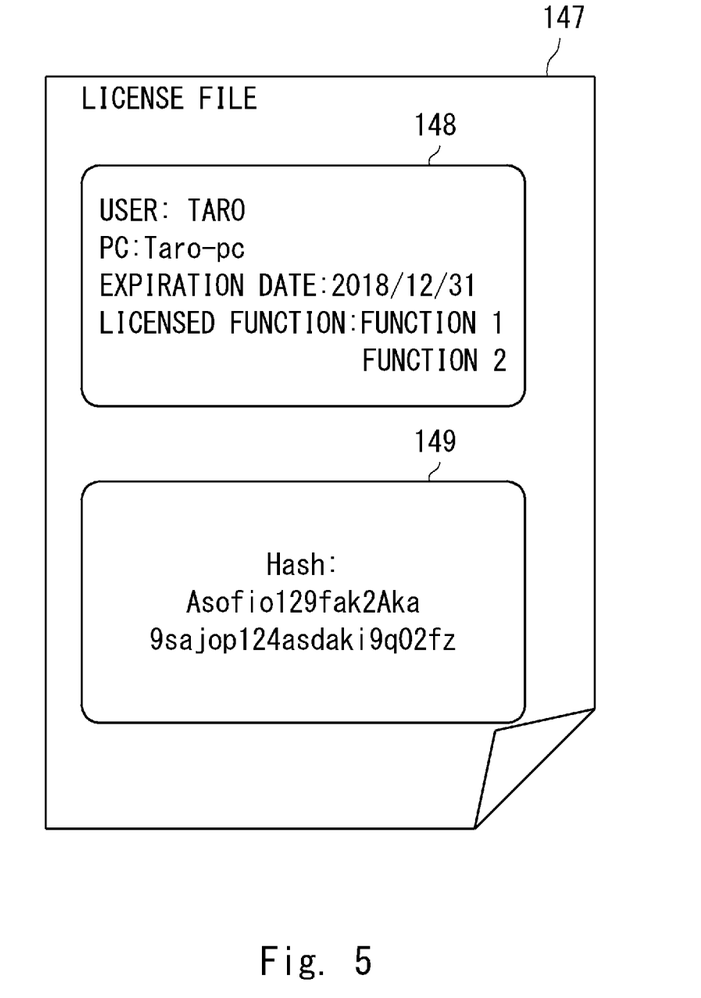
FIG. 5 is a view showing a specific example of a license file.

FIG. 5 shows a specific example of a license file. The license file 147 contains a readable information part 148 and a summary information part 149. The readable information part 148 contains a user name of a user who is allowed to perform execution, a PC name, an expiration date, and the licensed function information. The license issuing device 110 generates the readable information part 148 according to the business AP 144 to which the license file is issued. In the generation of the readable information part 148, the license issuing device 110 refers to a table that stores the business APs 144 and the functions used in each business AP 144 in association with each other, for example, and generates the licensed function information for each business AP 144. In the example of FIG. 5, the functions 1 and 2 are specified as functions that are allowed to be used in the licensed function information.

The summary information part 149 is an information part that is a summary of the readable information part 148. The license issuing device 110 generates the summary information part 149 by summarizing the generated readable information part 148 with use of a specified hash function. In the license authentication, the authentication server 120 or the processor 141 reads the readable information part 148 from the license file 147, summarizes the readable information part 148 by using a specified hash function, and compares the summarized information with the summary information part 149. By checking whether they match or not, the determination as whether the readable information part 148 is tampered or not can be made.

When the result of the license authentication indicates authentication success, the processor 141 activates the function specified by the licensed function information in the license file among the functions contained in the library 145 in the execution of the business AP 144. The processor 141 decrypts only the function specified by the licensed function information among the plurality of functions contained in the encrypted library 145, for example, and loads it into the memory 142. The processor 141 executes processing by using the function loaded into the memory 142. When the execution of the business AP 144 ends, the processor 141 discards the function loaded into the memory 142.

In the case where the application program to be executed is the business AP_A (see FIG. 4), for example, the processor 141 activates only the functions 1 and 3 among the functions 1 to 5 contained in the library 145. The processor 141 decrypts only the functions 1 and 3 among the functions 1 to 5 in the encrypted library 145, for example, and loads them into the memory 142. The processor 141 executes processing by using the functions 1 and 3 loaded into the memory 142. When the execution of the business AP_A ends, the processor 141 discards the functions 1 and 3 loaded into the memory 142.

Figure 6:
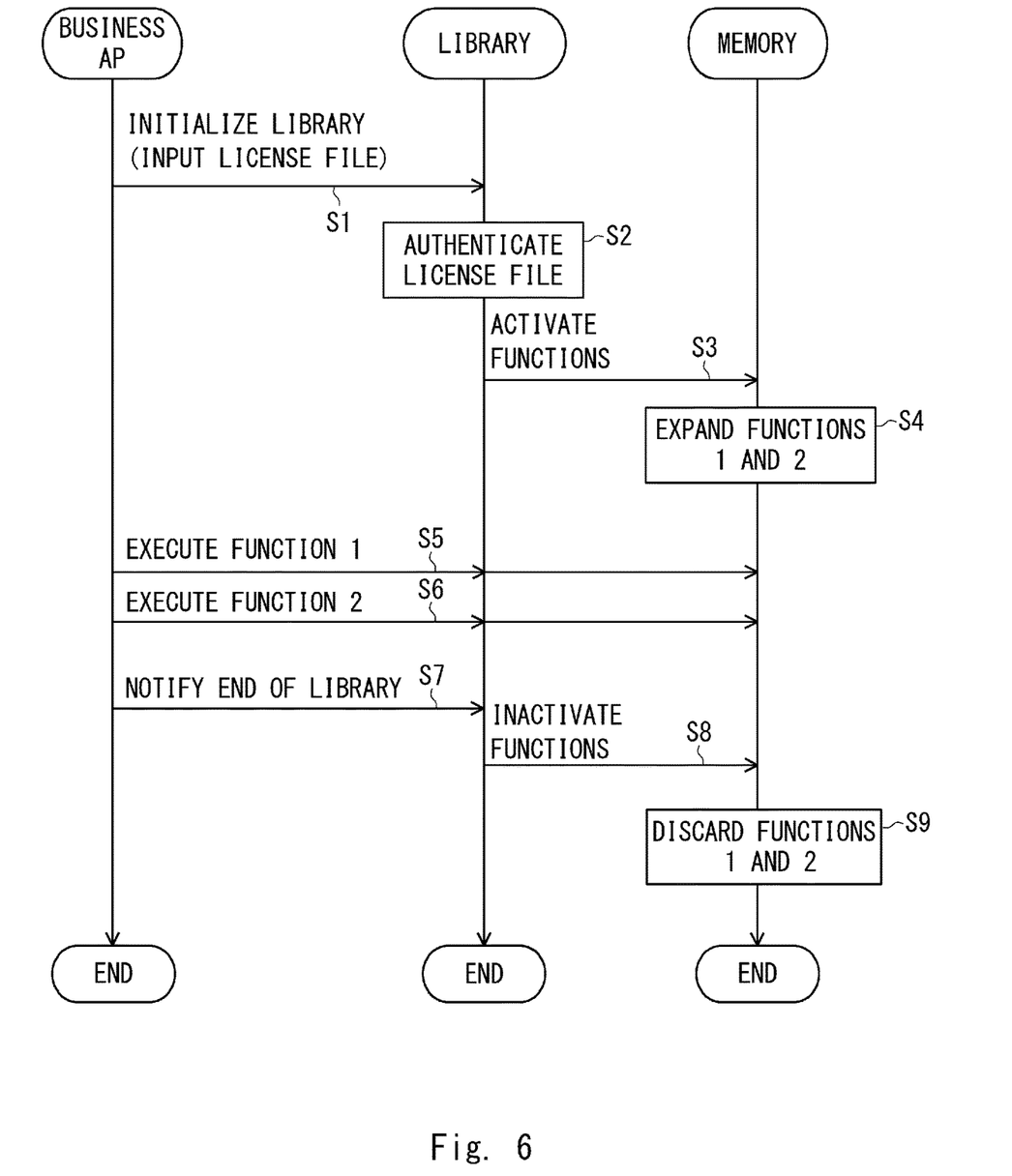
FIG. 6 is a flowchart showing an operation procedure of the program execution device.

FIG. 6 shows an operation procedure of the program execution device 140. When a user executes the business AP 144 on the program execution device 140, the business AP 144 (processor 141) initializes the library 145 contained in the business AP 144 (Step S1). The business AP 144 inputs a license file to the library 145 in Step S1. The library 145 (processor 141) authenticates the license file (Step S2). At this time, the processor 141 may request the authentication server 120 to perform the license authentication, or may perform the license authentication by itself. When the license authentication is failed, the process ends.

When the license authentication is successful, the processor 141 activates the functions specified by the license file 147 (Step S3). In Step S3, the processor 141 decrypts the functions specified by the licensed function information in the library 145 encrypted and stored in the auxiliary storage device 143.

The processor 141 loads the decrypted functions into the memory 142 (Step S4). In the program execution, the processor 141 executes the function 1 loaded into the memory 142 (Step S5). Further, in the program execution, the processor 141 executes the function 2 loaded into the memory (Step S6). Note that the functions that are not specified by licensed function information remain encrypted in the auxiliary storage device 143, and the processor 141 cannot execute the functions that are not specified.

The business AP 144 (processor 141) notifies the library 145 of the end of the program execution (Step S7). The library 145 (processor 141) inactivates the functions loaded into the memory (Step S8), and the memory 142 discards the functions 1 and 2 (Step S9). By this discarding in the memory at the end of program execution, the functions 1 and 2 become unavailable.

In this example embodiment, the license issuing device 110 issues the license file containing the licensed function information that specifies a licensed function among a plurality of functions in the library. The program execution device 140 executes an application program by using the functions specified by the licensed function information. In this manner, when the library contains a plurality of functions, the function in the library that is executable by the application program can be limited to a certain function. For example, this allows only a certain function in the library to be executable for one application program, and allows only another certain function in the library to be executable for another application program.

In related art, because a license is issued for the entire application program, when a license for a certain application program is authenticated, a user (program) can access the entire library. Thus, in the case where a library contains a plurality of functions and it is desirable to limit the function usable from an application program to a certain function, it has been necessary to extract this certain function only from the library and incorporate it into the application program. In contrast, in this example embodiment, when a plurality of application programs are created using the same library, the function usable in this library can be limited for each application program. This eliminates the need to extract only a certain function from a library and incorporate it into an application at the time of creating an application program, which facilitates the creation of the application program. Further, in this example embodiment, it is possible to add a function which an application program can use by adding the licensed function information, and therefore the addition of functions is facilitated.

Note that, in each of the above-described example embodiments, the program can be stored using any type of non-transitory computer readable media and provided to a computer. The non-transitory computer readable media include any type of tangible storage media. Examples of non-transitory computer readable media include magnetic storage media such as flexible disks, magnetic tapes or hard disks, optical magnetic storage media such as magneto-optical disks, optical disc media such as CD (Compact Disc) or DVD (Digital Versatile Disk), and semiconductor memories such as mask ROM, PROM (Programmable ROM), EPROM (Erasable PROM), flash ROM or RAM (Random Access Memory). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

While the present disclosure has been particularly shown and described with reference to example embodiments thereof, the present disclosure is not limited to the above-described example embodiments, and various changes and modifications may be made therein without departing from the spirit and scope of the present disclosure.

For example, the whole or part of the example embodiments disclosed above can be described as, but not limited to, the following supplementary notes.

[Supplementary Note 1]

A license management device comprising:

a license issuing means for issuing, to an application program using a library containing a plurality of functions, a license file containing licensed function information for specifying a function allowed to be used among the plurality of functions contained in the library;

an authentication means for performing license authentication based on the license file;

a function activation means for activating a function specified by the licensed function information among the plurality of functions based on a result of the license authentication; and a program execution means for executing the application program by using the activated function.

[Supplementary Note 2]

The license management device according to Supplementary Note 1, wherein the library is encrypted and stored in a storage device, and the function activation means activates the function by decrypting the function specified by the licensed function information and loading the function into a memory, and the program execution means uses the function loaded into the memory.

[Supplementary Note 3]

The license management device according to Supplementary Note 2, wherein the function activation means discards the function loaded into the memory when execution of the application program ends.

[Supplementary Note 4]

The license management device according to any one of Supplementary Notes 1 to 3, wherein the license file further contains hardware information of a device where the application program is to be executed.

[Supplementary Note 5]

The license management device according to Supplementary Note 4, further comprising:

a hardware information acquisition means for acquiring hardware information of a device where the application program is to be executed, wherein the license issuing means puts the hardware information acquired by the hardware information acquisition means into the license file.

[Supplementary Note 6]

The license management device according to Supplementary Note 5, wherein, in the license authentication, the authentication means compares hardware information acquired from a device where the application program is to be executed with the hardware information contained in the license file.

[Supplementary Note 7]

The license management device according to any one of Supplementary Notes 1 to 6, wherein the license file includes a first part containing the licensed function information and a second part which is a summary of the first part, and in the license authentication, the authentication means summarizes the first part and compares the summarized first part with the second part.

[Supplementary Note 8]

The license management device according to Supplementary Note 7, wherein the license issuing means generates the first part in accordance with an application to which the license file is to be issued, and generates the second part by summarizing the generated first part by using a specified hash function.

[Supplementary Note 9]

The license management device according to any one of Supplementary Notes 1 to 8, wherein the license file is stored in a specified electronic device and provided to a user.

[Supplementary Note 10]

The license management device according to Supplementary Note 9, wherein the specified electronic device is a USB (Universal Serial Bus) dongle.

[Supplementary Note 11]

A license issuing device comprising:

a license issuing means for issuing, to an application program using a library containing a plurality of functions, a license file containing licensed function information for specifying a function allowed to be used among the plurality of functions contained in the library.

[Supplementary Note 12]

The license issuing device according to Supplementary Note 11, wherein the license file further contains hardware information of a device where the application program is to be executed.

[Supplementary Note 13]

The license issuing device according to Supplementary Note 12, wherein the license issuing means acquires hardware information from a device where the application program is to be executed, and puts the acquired hardware information into the license file.

[Supplementary Note 14]

The license issuing device according to any one of Supplementary Notes 11 to 13, wherein the license file includes a first part containing the licensed function information and a second part which is a summary of the first part, and the license issuing means generates the first part in accordance with an application to which the license file is to be issued, and generates the second part by summarizing the generated first part by using a specified hash function.

[Supplementary Note 15]

A program execution device comprising:

a function activation means for, based on a result of license authentication performed based on a license file issued to an application program using a library containing a plurality of functions, the license file containing licensed function information for specifying a function allowed to be used among the plurality of functions contained in the library, activating a function specified by the licensed function information among the plurality of functions; and a program execution means for executing the application program by using the activated function.

[Supplementary Note 16]

The program execution device according to Supplementary Note 15, wherein the library is encrypted and stored in a storage device, and the function activation means activates the function by decrypting the function specified by the licensed function information and loading the function into a memory, and the program execution means uses the function loaded into the memory.

[Supplementary Note 17]

The program execution device according to Supplementary Note 16, wherein the function activation means discards the function loaded into the memory when execution of the application program ends.

[Supplementary Note 18]

A license issuing method comprising:

issuing, to an application program using a library containing a plurality of functions, a license file containing licensed function information for specifying a function allowed to be used among the plurality of functions contained in the library.

[Supplementary Note 19]

A program execution method comprising:

based on a result of license authentication performed based on a license file issued to an application program using a library containing a plurality of functions, the license file containing licensed function information for specifying a function allowed to be used among the plurality of functions contained in the library, activating a function specified by the licensed function information among the plurality of functions; and executing the application program by using the activated function.

[Supplementary Note 20]

A computer-readable medium storing a license issuing program causing a computer to perform processing of issuing, to an application program using a library containing a plurality of functions, a license file containing licensed function information for specifying a function allowed to be used among the plurality of functions contained in the library.

[Supplementary Note 21]

A computer-readable medium storing an application program causing a computer to perform processing of:

based on a result of license authentication performed based on a license file containing licensed function information for specifying a function allowed to be used among a plurality of functions contained in a library containing the plurality of functions, activating a function specified by the licensed function information among the plurality of functions; and executing specified processing by using the activated function.

This application is based upon and claims the benefit of priority from Japanese patent application No. 2018-146307 filed on Aug. 2, 2018, the disclosure of which is incorporated herein in its entirety by reference.

REFERENCE SIGNS LIST

10 LICENSE MANAGEMENT DEVICE
11 LICENSE ISSUING MEANS
12 AUTHENTICATION MEANS
13 FUNCTION ACTIVATION MEANS
14 PROGRAM EXECUTION MEANS
20 LIBRARY
100 LICENSE MANAGEMENT SYSTEM
110 LICENSE ISSUING DEVICE
120 AUTHENTICATION SERVER
130 PROGRAM PROVIDING SERVER
140 PROGRAM EXECUTION DEVICE
141 PROCESSOR
142 MEMORY
143 AUXILIARY STORAGE DEVICE
144 BUSINESS AP
145 LIBRARY
146 HW INFORMATION ACQUISITION PROGRAM
147 LICENSE FILE
148 READABLE INFORMATION PART
149 SUMMARY INFORMATION PART
150 USER DB
160 USB DONGLE
200 NETWORK

What is claimed is:

1. A license management device comprising:
at least one memory storing instructions, and
at least one processor configured to execute the instructions to:
issue, to an application program using a library containing a plurality of functions, a license file containing licensed function information for specifying a function allowed to be used among the plurality of functions contained in the library;
perform license authentication based on the license file;
activate a function specified by the licensed function information among the plurality of functions based on a result of the license authentication;
execute the application program by using the activated function; and
discard the function loaded into the memory when execution of the application program ends, wherein
the library is encrypted and stored in a storage device, and
the at least one processor is configured to execute the instructions to further:
decrypt, when the application program is executed, the function specified by the licensed function information from among the plurality of functions contained in the library and load the decrypted function into the memory to activate the function, and
use the function loaded into the memory in execution of the application program, wherein
the functions contained in the library that are not specified by the licensed function information are not decrypted and remain unavailable for usage in the execution of the application program.

2. The license management device according to claim 1, wherein the license file further contains hardware information of a device where the application program is to be executed.

3. The license management device according to claim 2, at least one processor is further configured to execute the instructions to:
acquire hardware information of a device where the application program is to be executed,
wherein the at least one processor is further configured to execute the instructions to put the hardware information acquired into the license file.

4. The license management device according to claim 3, wherein, in the license authentication, the at least one processor is further configured to execute the instructions to compare hardware information acquired from a device where the application program is to be executed with the hardware information contained in the license file.

5. The license management device according to claim 1, wherein
the license file includes a first part containing the licensed function information and a second part which is a summary of the first part, and
in the license authentication, the at least one processor is further configured to execute the instructions to summarize the first part and compares the summarized first part with the second part.

6. The license management device according to claim 5, wherein the at least one processor is further configured to execute the instructions to generate the first part in accordance with an application program to which the license file is to be issued, and generates the second part by summarizing the generated first part by using a specified hash function.

7. The license management device according to claim 1, wherein the license file is stored in a specified electronic device and provided to a user.

8. The license management device according to claim 7, wherein the specified electronic device is a USB (Universal Serial Bus) dongle.

9. A program execution device comprising:
at least one memory storing instructions, and
at least one processor configured to execute the instructions to:
decrypt, when an application program is executed, based on a result of license authentication performed based on a license file issued to the application program using a library containing a plurality of functions, the license file containing licensed function information for specifying a function allowed to be used among the plurality of functions contained in the library and the library being encrypted and stored in a storage device, a function specified by the licensed function information among the plurality of functions;
load the decrypted function in to the memory to activate the function;
execute the application program and use the function loaded into the memory in execution of the application program; and
discard the function loaded into the memory when execution of the application program ends, wherein
the functions contained in the library that are not specified by the licensed function information are not decrypted and remain unavailable for usage in the execution of the application program.

10. A program execution method comprising:
decrypting, when an application program is executed, based on a result of license authentication performed based on a license file issued to the application program using a library containing a plurality of functions, the license file containing licensed function information for specifying a function allowed to be used among the plurality of functions contained in the library and the library being encrypted and stored in a storage device, a function specified by the licensed function information among the plurality of functions;
loading the decrypted function in to a memory to activate the function;
executing the application program and using the function loaded into the memory in execution of the application program; and
discarding the function loaded into the memory when execution of the application program ends, wherein
the functions contained in the library that are not specified by the licensed function information are not decrypted and remain unavailable for usage in the execution of the application program.

* * * * *